W. A. ROER.
SACK PROTECTOR.
APPLICATION FILED MAY 8, 1918
1,296,431.
Patented Mar. 4, 1919.
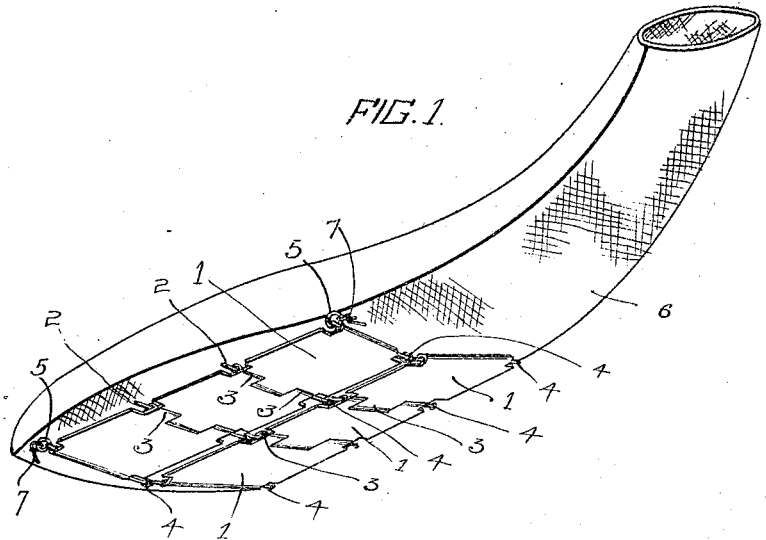
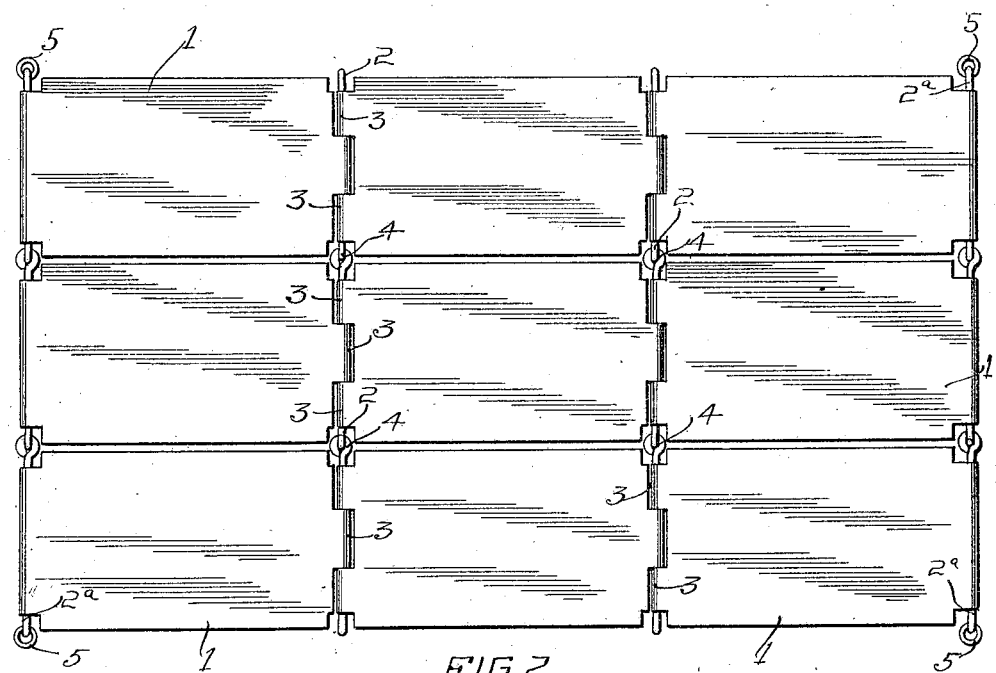
Witnesses
K. A. Thomas.
J. W. Garner
Inventor
William A. Roer.
By Victor J. Evans
Attorney

UNITED STATES PATENT OFFICE.

WILLIAM A. ROER, OF WICHITA FALLS, TEXAS.

SACK-PROTECTOR.

1,296,431.     Specification of Letters Patent.     Patented Mar. 4, 1919.

Application filed May 8, 1918. Serial No. 233,282.

*To all whom it may concern:*

Be it known that I, WILLIAM A. ROER, a citizen of the United States, residing at Wichita Falls, in the county of Wichita and State of Texas, have invented new and useful Improvements in Sack-Protectors, of which the following is a specification.

This invention is an improved protector for use on a sack such as is used in picking cotton, to protect the sack and prevent the sack from being worn out by dragging the same on the ground between the cotton rows, the object of the invention being to provide an improved device of this kind which is simple in construction, which is effective as a protector for a cotton sack, and which can be readily detached from the sack when the latter, with its contents, is weighed.

With the above and other objects in view, the invention consists in the construction, combination and arrangement of devices hereinafter described and claimed.

In the accompanying drawings:—

Figure 1 is a perspective view of a cotton sack provided with a protector constructed and arranged in accordance with my invention.

Fig. 2 is a detail plan of the protector.

My improved cotton sack protector comprises a series of sections 1, which are preferably made of sheet metal and which may be of any suitable form, but are here shown as of oblong rectangular form. The said sections are connected together at their ends by rods 2 which engage and extend through hinge members 3 formed at the ends of the sections, and the said rods have their ends flexibly and pivotally connected together as at 4, so that the protector is rendered flexible throughout its length and breadth and the sections are connected together at their ends for pivotal movement longitudinally of the protector and also transversely thereof. The rods 2ª which are at the outer ends of the end sections are provided, at the outer corners of the protector with rings 5 which are pivotally attached to said rods, and the cotton sack 6, which is of the usual form, is provided at opposite sides, near the bottom, and also at points a suitable distance from the bottom with attaching cords 7 by means of which the sack may be detachably secured to the rings and hence to the protector.

The protector is used on the lower side of the sack, that is to say on the side of the sack next to the ground, so that the protector serves to prevent the sack from coming in direct contact with the ground between the cotton rows, and hence prevents the sack from being worn out by being dragged by the picker on the ground between the rows while the sack is being filled.

Owing to the provision of means whereby the protector may be readily detached from the sack, the protector can be removed when the sack together with its contents is to be weighed.

I claim:

1. A cotton sack protector comprising a series of sections pivotally connected together at their ends for longitudinal angular movement and also for transverse relative angular movement, so that the protector is rendered flexible and can be bent either longitudinally or transversely.

2. A cotton sack protector comprising a series of sections having hinge members at their ends, pintle rods extending through said hinge members and pivotally connecting the ends of the sections together, said pintle rods being pivotally connected together at their ends between the sections so that the protector may be bent either longitudinally or transversely.

In testimony whereof I affix my signature.

WILLIAM A. ROER.

Copies of this patent may be obtained for five cents each, by addressing the "Commissioner of Patents, Washington, D. C."